US007176270B2

(12) United States Patent
Tabei

(10) Patent No.: US 7,176,270 B2
(45) Date of Patent: Feb. 13, 2007

(54) CURABLE COMPOSITION

(75) Inventor: Eiichi Tabei, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 316 days.

(21) Appl. No.: 10/960,048

(22) Filed: Oct. 8, 2004

(65) Prior Publication Data

US 2005/0080154 A1  Apr. 14, 2005

(30) Foreign Application Priority Data

Oct. 10, 2003  (JP) .............................. 2003-352714

(51) Int. Cl.
*C08G 77/50* (2006.01)
(52) U.S. Cl. .......................... 528/43; 528/15; 528/31; 528/32; 528/37; 528/10; 525/478; 525/479
(58) Field of Classification Search ................. 528/10, 528/15, 31, 32, 37, 38, 43; 525/478, 479
See application file for complete search history.

(56) References Cited

U.S. PATENT DOCUMENTS

| 4,877,820 | A | 10/1989 | Cowan |
| 5,013,809 | A | 5/1991 | Leibfried, Sr. |
| 5,068,303 | A | 11/1991 | Bard et al. |
| 5,077,134 | A | 12/1991 | Leibfried, Sr. |
| 5,147,945 | A | 9/1992 | Woodside |
| 5,171,817 | A | 12/1992 | Barnum et al. |
| 5,196,498 | A | 3/1993 | Leibfried, Sr. |
| 5,298,536 | A | 3/1994 | Babcock et al. |
| 5,340,644 | A | 8/1994 | Babcock et al. |
| 5,466,512 | A | 11/1995 | Babcock et al. |
| 5,466,728 | A | 11/1995 | Babcock et al. |
| 2004/0214966 | A1 | 10/2004 | Tabei et al. |

FOREIGN PATENT DOCUMENTS

| FR | 2 595 363 | 9/1987 |
| FR | 2 595 364 | 9/1987 |
| JP | 10-228249 | 8/1998 |
| JP | 10-242513 | 9/1998 |
| JP | 2000-123981 | 4/2000 |
| JP | 2002-324920 | 11/2002 |
| JP | 2002-327114 | 11/2002 |
| JP | 2002-327126 | 11/2002 |
| JP | 2002-338833 | 11/2002 |
| JP | 2002-341101 | 11/2002 |
| WO | WO 01/46295 A1 | 6/2001 |

*Primary Examiner*—Sanza L. McClendon
(74) *Attorney, Agent, or Firm*—Oblon, Spivak, McClelland, Maier & Neustadt, P.C.

(57) ABSTRACT

Provided is a curable composition including (A) an addition reaction product of (a) a compound with 2 silicon atom-bonded hydrogen atoms within each molecule, having a general formula (1):

$$H-\underset{R}{\overset{R}{\underset{|}{Si}}}-A-\underset{R}{\overset{R}{\underset{|}{Si}}}-H \quad (1)$$

wherein, A is a bivalent group represented by a formula (2):

$$-O-(\underset{R'}{\overset{R'}{\underset{|}{Si}}}O)_{n}- \quad (2)$$

(wherein, R' represents an unsubstituted or substituted monovalent hydrocarbon group of 1 to 12 carbon atoms, or an alkoxy group of 1 to 6 carbon atoms, and n represents an integer from 0 to 100), or a group having a structural formula (3):

$$\text{(phenylene group)} \quad (3)$$

and each R represents an unsubstituted or substituted monovalent hydrocarbon group of 1 to 12 carbon atoms, or an alkoxy group of 1 to 6 carbon atoms, and (b) a polycyclic hydrocarbon with 2 addition reactive carbon-carbon double bonds within each molecule, said addition reaction product containing at least two addition reactive carbon-carbon double bonds in each molecule, (B) a compound with at least 3 silicon atom-bonded hydrogen atoms within each molecule, and (C) a hydrosilylation reaction catalyst. This composition is useful as a material for optical devices or parts, insulation material for electronic devices or parts, or coating material.

9 Claims, No Drawings

CURABLE COMPOSITION

BACKGROUND OF THE INVENTION

1. Field of the Invention

The present invention relates to a curable composition comprising a component with a polycyclic hydrocarbon skeleton, which is useful as a material for optical devices or parts, insulation material for electronic devices or parts, or coating material.

2. Description of the Prior Art

Conventionally, epoxy resins have normally been used as a material for optical devices or parts, in particular, sealing material for light emitting diode (LED) elements. Furthermore, in the case of silicone resins, tests have been conducted relating to their use as molded members and the like for LED elements (see patent reference 1 and patent reference 2), or their use as color filter materials (see patent reference 3), although actual applications are few.

In recent years, with white LEDs attracting considerable attention, factors which until now have been considered unimportant, such as the yellowing of epoxy sealing materials caused by ultraviolet light or the like, and the appearance of cracks and the like caused by the increases in heating value accompanying miniaturization, now require urgent solutions. The use of cured products of silicone resins with a large quantity of phenyl groups within the molecules is being investigated as one potential solution to these problems. However, future LED light sources are likely to follow the trend towards the use of devices that generate light of shorter wavelengths, and because both epoxy sealing materials and phenyl group-containing silicone resin based sealing materials display poor light transmittance in shorter wavelength regions, their application to such LEDs that generate light in the shorter wavelength regions has proven problematic.

Furthermore, optical material compositions comprising, as essential components, an organic compound with at least 2 carbon-carbon double bonds within each molecule, and a silicon compound with at least 2 silicon atom-bonded hydrogen atoms within each molecule, have also been proposed (see patent reference 4 to patent reference 8). However, problems arise when these compositions undergo heat curing to generate a cured product, including foaming, curing shrinkage, and coloring of the cured product.

| | |
|---|---|
| [Patent Reference 1] | JP10-228249A |
| [Patent Reference 2] | JP10-242513A |
| [Patent Reference 3] | JP2000-123981A |
| [Patent Reference 4] | JP2002-324920A |
| [Patent Reference 5] | JP2002-327114A |
| [Patent Reference 6] | JP2002-327126A |
| [Patent Reference 7] | JP2002-338833A |
| [Patent Reference 8] | JP2002-341101A |

SUMMARY OF THE INVENTION

The present invention takes the above problems associated with the conventional technology into consideration, with an object of providing a curable composition, which is useful as a material for optical devices or parts, insulation material for electronic devices or parts, or coating material, and which yields a cured product that displays excellent hardness and strength, as well as excellent light transmittance in shorter wavelength regions.

[Means for Solution of the Problems]

As a result of intensive investigations aimed at achieving the above object, the inventors of the present invention were able to complete the present invention.

In other words, the present invention provides a curable composition comprising:

(A) an addition reaction product of (a) a compound with 2 silicon atom-bonded hydrogen atoms within each molecule, represented by a general formula (1) shown below:

(1)

[wherein, A is a bivalent group selected from a group consisting of groups represented by a general formula (2) shown below:

(2)

(wherein, each R' represents, independently, an unsubstituted or substituted monovalent hydrocarbon group of 1 to 12 carbon atoms, or an alkoxy group of 1 to 6 carbon atoms, and n represents an integer from 0 to 100), and groups represented by a structural formula (3) shown below:

(3)

and each R represents, independently, an unsubstituted or substituted monovalent hydrocarbon group of 1 to 12 carbon atoms, or an alkoxy group of 1 to 6 carbon atoms], and (b) a polycyclic hydrocarbon with 2 addition reactive carbon-carbon double bonds within each molecule, said addition reaction product containing at least two addition reactive carbon-carbon double bond in each molecule, (B) a compound comprising at least 3 silicon atom-bonded hydrogen atoms within each molecule, and (C) a hydrosilylation reaction catalyst.

A curable composition of the present invention yields a cured product that displays excellent hardness and strength, no curing shrinkage, superior light transmittance of light from shorter wavelength regions, and excellent transparency. Accordingly, the composition can be favorably used in applications such as the protection, sealing and bonding of light emitting diode elements, as well as for wavelength modification and adjustment, and for lenses. Furthermore, the composition is also useful as a lens material, a sealing material for optical devices or optical parts, a variety of optical materials such as display materials, an insulating material for electronic devices or electronic parts, and a coating material.

DETAILED DESCRIPTION OF THE PREFERRED EMBODIMENTS

As follows is a more detailed description of the present invention.

[Component (A)]

The component (A) of a composition of the present invention is an addition reaction product of (a) a compound with 2 silicon atom-bonded hydrogen atoms within each molecule, represented by a general formula (1) shown below:

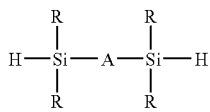
(1)

[wherein, A is a bivalent group selected from a group consisting of groups represented by a general formula (2) shown below:

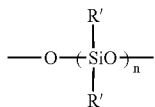
(2)

(wherein, each R' represents, independently, an unsubstituted or substituted monovalent hydrocarbon group of 1 to 12 carbon atoms, or an alkoxy group of 1 to 6 carbon atoms, and n represents an integer from 0 to 100), and groups represented by a structural formula (3) shown below:

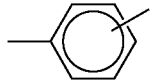
(3)

and each R represents, independently, an unsubstituted or substituted monovalent hydrocarbon group of 1 to 12 carbon atoms, or an alkoxy group of 1 to 6 carbon atoms], and (b) a polycyclic hydrocarbon with 2 addition reactive carbon-carbon double bonds within each molecule, said addition reaction product containing at least two addition reactive carbon-carbon double bond in each molecule.

<Component (a)>

In those cases where within the compound (a) containing two silicon atom-bonded hydrogen atoms (hereinafter, also referred to as "SiH") within each molecule as represented by the general formula (1) above, which represents one of the reaction raw materials for the component (A), the group A within the general formula (1) is a bivalent group represented by the general formula (2) shown above, the compound includes those compounds represented by a general formula (4) shown below:

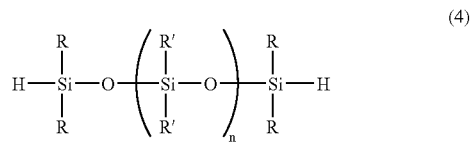
(4)

(wherein, each R and each R' represents, independently, an unsubstituted or substituted monovalent hydrocarbon group of 1 to 12 carbon atoms, and preferably from 1 to 6 carbon atoms, or an alkoxy group of 1 to 6 carbon atoms, and preferably from 1 to 4 carbon atoms, and n represents an integer from 0 to 100, and preferably from 0 to 10).

In the above formula, in those cases where R or R' represents an aforementioned monovalent hydrocarbon group, suitable examples of the group include an alkyl group such as a methyl group, ethyl group, propyl group, isopropyl group, butyl group, tert-butyl group, pentyl group, isopentyl group, hexyl group, or sec-hexyl group; a cycloalkyl group such as a cyclopentyl group or cyclohexyl group; an aryl group such as a phenyl group or an o-, m- or p-tolyl group; an aralkyl group such as a benzyl group or 2-phenylethyl group; an alkenyl group such as a vinyl group, allyl group, 1-butenyl group, or 1-hexenyl group; an alkenylaryl group such as a p-vinylphenyl group; or a group in which at least one hydrogen atom bonded to a carbon atom within an aforementioned group has been substituted with a substituent such as a halogen atom, a cyano group or an epoxy ring-containing group, including a halogenated alkyl group such as a chloromethyl group, 3-chloropropyl group, or 3,3,3-trifluoropropyl group; a 2-cyanoethyl group; or a 3-glycidoxypropyl group.

Furthermore, in those cases where R or R' represents an aforementioned alkoxyl group, suitable examples of the group include a methoxy group, ethoxy group, propoxy group, isopropoxy group, butoxy group, sec-butoxy group, or tert-butoxy groups.

Of the above, compounds in which the groups R and R' are groups other than alkenyl groups or alkenylaryl groups are preferred, and compounds in which all of the groups R and R' are methyl groups are particularly preferred in terms of the ease with which they can be produced industrially, and their resulting availability.

Specific examples of preferred compounds represented by the above general formula (4) are presented below, although the compound is not restricted to the structures shown. In the formulas, "Me" represents a methyl group.

$HMe_2SiOSiMe_2H$ $HMe_2SiO(Me_2SiO)SiMe_2H$ $HMe_2SiO(Me_2SiO)_4SiMe_2H$ $HMe_2SiO(Me_2SiO)_8SiMe_2H$ $HMe_2SiO(Me_2SiO)_{12}SiMe_2H$.

The compound represented by the above general formula (4) can use either a single compound, or a combination of two or more compounds.

In those cases where within the compound (a) containing 2 SiH groups within each molecule as represented by the general formula (1) above, which represents one of the reaction raw materials for the component (A), the group A within the general formula (1) is a bivalent group represented by the general formula (3) shown above, the compound includes those compounds represented by a general formula (5) shown below:

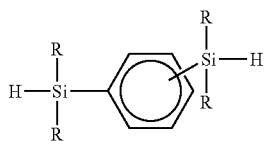

(5)

(wherein, R is as defined above in relation to the general formula (4)).

Examples of the groups R in the general formula (5) shown above include the same groups described for the groups R in the aforementioned general formula (4), and groups other than alkenyl groups or alkenylaryl groups are preferred, and compounds in which all of the groups R are methyl groups are particularly preferred.

Specific examples of compounds represented by the above general formula (5) include silphenylene compounds such as 1,4-bis(dimethylsilyl)benzene, represented by the structural formula: $HMe_2Si\text{-}p\text{-}C_6H_4\text{—}SiMe_2H$, and 1,3-bis(dimethylsilyl)benzene represented by the structural formula: $HMe_2Si\text{-}m\text{-}C_6H_4\text{—}SiMe_2H$.

The compound represented by the above general formula (5) can use either a single compound, or a combination of two or more compounds.

In addition, the aforementioned component (a), which represents one of the reaction raw materials for the component (A) can use either a single compound, or a combination of two or more compounds.

<Component (b)>

In the polycyclic hydrocarbon (b) with 2 addition reactive carbon-carbon double bonds within each molecule, which represents one of the reaction raw materials for the component (A), the term "addition reactive" describes the property of being able to undergo an addition with a silicon atom-bonded hydrogen atom, well known as hydrosilylation reaction.

The component (b) may be any one of: (i) a hydrocarbon in which addition reactive carbon-carbon double bonds are formed between two adjacent carbon atoms from amongst the carbon atoms that form the polycyclic skeleton of the polycyclic hydrocarbon, (ii) a hydrocarbon in which hydrogen atoms bonded to carbon atoms that form the polycyclic skeleton of the polycyclic hydrocarbon are substituted with groups containing addition reactive carbon-carbon double bonds, or (iii) a hydrocarbon in which an addition reactive carbon-carbon double bond is formed between two adjacent carbon atoms from amongst the carbon atoms that form the polycyclic skeleton of the polycyclic hydrocarbon, and a hydrogen atom bonded to a carbon atom that forms the polycyclic skeleton of the polycyclic hydrocarbon is substituted with a group containing an addition reactive carbon-carbon double bond.

Examples of this component (b) include 5-vinylbicyclo[2.2.1]hept-2-ene, represented by a structural formula (x) shown below:

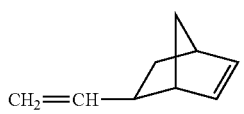

(x)

6-vinylbicyclo[2.2.1]hept-2-ene, represented by a structural formula (y) shown below:

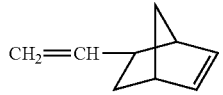

(y)

or a combination of these two compounds (hereafter, in those cases where there is no need to differentiate between these three options, the generic term "vinylnorbornene" may be used); as well as dicyclopentadiene, represented by a structural formula (z) shown below.

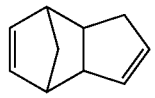

(z)

The position of substitution for the vinyl group in the above vinylnorbornenes may result in either a cis arrangement (the exo form) or a trans arrangement (the endo form), or alternatively, because the variation in the position of substitution does not cause any significant changes in the reactivity or the like of the component, a combination of both isomers is also suitable.

<Preparation of the Component (A)>

The component (A) of a composition of the present invention can be produced as an addition reaction product containing no SiH groups by conducting an addition reaction between 1 mol of the aforementioned component (a) containing 2 SiH groups within each molecule, and an excess, equivalent to more than 1 mol but no more than 10 mols, and preferably more than 1 mol but no more than 5 mols, of the aforementioned component (b) containing 2 addition reactive carbon-carbon double bonds within each molecule, in the presence of a hydrosilylation reaction catalyst.

The component (A) thus obtained may contain addition reactive carbon-carbon double bonds derived from the component (a), (specifically, derived from R in the general formula (1) and/or R' in the general formula (2)), in addition to addition reactive carbon-carbon double bonds derived from the component (b); therefore, the component (A) contains at least two addition reactive carbon-carbon double bonds in each molecule. The number of the addition reactive carbon-carbon double bonds in each molecule is preferably 2 to 6, and more preferably two. If there are too many addition reactive carbon-carbon double bonds in a molecule of the component (A), cracks may be liable to occur in cured products of the composition according to the present invention.

The hydrosilylation reaction catalyst mentioned above can use any of the conventionally available materials. Suitable examples include platinum based catalysts such as carbon powder with supported metallic platinum, platinum black, platinum (IV) chloride, chloroplatinic acid, reaction products of chloroplatinic acid and monovalent alcohols, complexes of chloroplatinic acid and olefins, and platinum bisacetoacetate; as well as other platinum group metal catalysts such as palladium based catalysts and rhodium based catalysts. Furthermore, there are no particular restrictions on the addition reaction conditions or the use of solvent, and normal practices can be followed.

As described above, during the production of the component (A), because the component (b) is used in molar excess relative to the component (a), the product component (A) contains two carbon-carbon double bonds derived from the structure of the component (b) within each molecule. In addition, the component (A) may also comprise structures in which residues derived from the component (a) are bonded together via bivalent polycyclic hydrocarbon residues derived from the structure of the component (b) but containing no addition reactive carbon-carbon double bonds.

In other words, examples of the component (A) include compounds represented by a general formula (6) shown below:

Y—X—(Y'—X)p-Y     (6)

(wherein, X is a bivalent residue of a compound of the component (a), Y is a monovalent residue of a polycyclic hydrocarbon of the component (b), Y' is a bivalent residue of the component (b), and p is an integer from 0 to 10, and preferably from 0 to 5).

The value of p, which represents the number of the repeating unit (Y'—X), can be controlled by adjusting the quantity of the molar excess of the component (b) that is reacted with each mol of the component (a).

Specific examples of the residue Y in the above general formula (6) include monovalent residues represented by the structural formulas shown below:

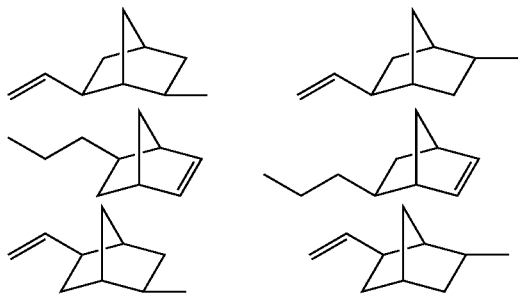

(hereafter, in those cases where there is no need to differentiate between the above 6 residues, the generic term "NB group" may be used, and the abbreviation "NB" may be used to refer to the above 6 structures without differentiation);

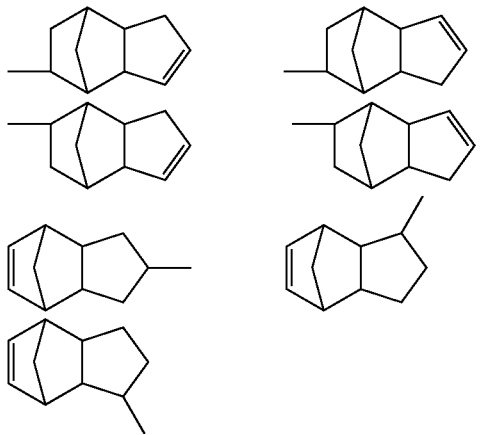

(hereafter, in those cases where there is no need to differentiate between the above 7 residues, these structures may be abbreviated using the term "DCP").

Specific examples of the residue Y' in the above general formula (6) include bivalent residues represented by the structural formulas shown below.

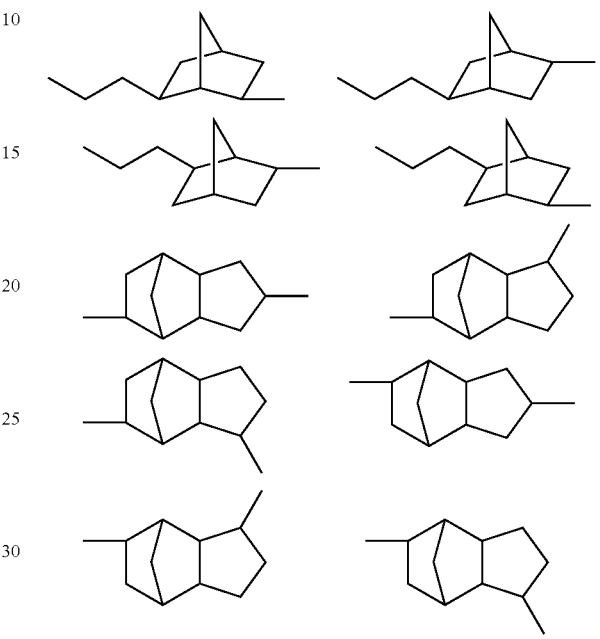

In the case of asymmetric bivalent residues represented by the above structural formulas, the left-right direction of the residue is not restricted to the orientation shown in the formula, and each of the structural formulas also includes the structure produced by a 180 degree rotation within the plane of the paper.

Specific examples of preferred forms of the above component (A) as represented by the general formula (6) above are presented below, although the component (A) is not restricted to the structures shown (and the meanings of "NB" and "DCP" are as described above).

NB-Me$_2$SiOSiMe$_2$-NB

NB-Me$_2$SiO(Me$_2$SiO)SiMe$_2$-NB

NB-Me$_2$SiO(Me$_2$SiO)$_4$SiMe$_2$-NB

NB-Me$_2$SiO(Me$_2$SiO)$_8$SiMe$_2$-NB

NB-Me$_2$SiO(Me$_2$SiO)$_{12}$SiMe$_2$-NB

NB-Me$_2$Si-p-C$_6$H$_4$—SiMe$_2$-NB

NB-Me$_2$Si-m-C$_6$H$_4$—SiMe$_2$-NB

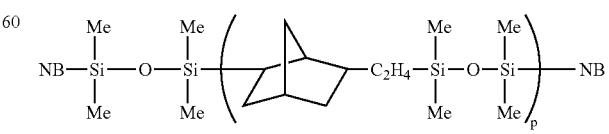

(wherein, p is an integer from 1 to 10)

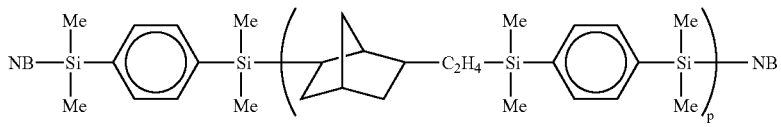

(wherein, p is an integer from 1 to 10)
DCP-Me$_2$SiOSiMe$_2$-DCP
DCP-Me$_2$SiO(Me$_2$SiO)SiMe$_2$-DCP
DCP-Me$_2$SiO(Me$_2$SiO)$_4$SiMe$_2$-DCP
DCP-Me$_2$SiO(Me$_2$SiO)$_8$SiMe$_2$-DCP
DCP-Me$_2$SiO(Me$_2$SiO)$_{12}$SiMe$_2$-DCP
DCP-Me$_2$Si-p-C$_6$H$_4$—SiMe$_2$-DCP
DCP-Me$_2$Si-m-C$_6$H$_4$—SiMe$_2$-DCP

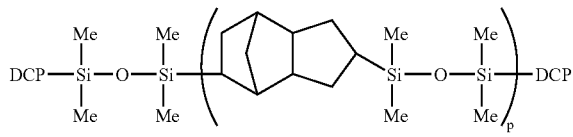

(wherein, p is an integer from 1 to 10)

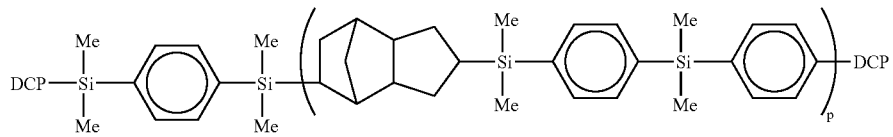

(wherein, p is an integer from 1 to 10).

In addition, the component (A) of the present invention can use either a single compound, or a combination of two or more compounds.

[Component (B)]

The component (B) of the present invention is a compound comprising at least 3 SiH groups within each molecule. The SiH groups within this component (B) undergo addition, via a hydrosilylation reaction, with the at least 2 addition reactive carbon-carbon double bonds within each molecule of the component (A), thereby forming a cured product with a three dimensional network structure.

Examples of the component (B) include cyclic siloxane based compounds represented by a general formula (7) shown below:

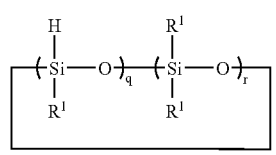

(7)

(wherein, each $R^1$ represents, independently, either a hydrogen atom, or an unsubstituted or substituted monovalent hydrocarbon group other than an alkenyl group, of 1 to 12 carbon atoms, and preferably 1 to 6 carbon atoms, q is an integer from 3 to 10, and preferably from 3 to 8, r is an integer from 0 to 7, and preferably from 0 to 2, and the sum of q+r is an integer from 3 to 10, and preferably from 3 to 6).

In those cases where a group $R^1$ in the above general formula (7) represents an unsubstituted or substituted monovalent hydrocarbon group other than an alkenyl group, suitable examples include an alkyl group such as a methyl group, ethyl group, propyl group, isopropyl group, butyl group, tert-butyl group, pentyl group, isopentyl group, hexyl group, or sec-hexyl group; a cycloalkyl group such as a cyclopentyl group or cyclohexyl group; an aryl group such as a phenyl group or an o-, m- or p-tolyl group; an aralkyl group such as a benzyl group or 2-phenylethyl group; an alkenylaryl group such as a p-vinylphenyl group; or a group in which at least one hydrogen atom bonded to a carbon atom within an aforementioned group has been substituted with a substituent such as a halogen atom, a cyano group or an epoxy ring-containing group, including a halogenated alkyl group such as a chloromethyl group, 3-chloropropyl group, or 3,3,3-trifluoropropyl group; a 2-cyanoethyl group; or a 3-glycidoxypropyl group.

Of the above, compounds in which all the groups $R^1$ are methyl groups are preferred in terms of the ease with which they can be produced industrially, and their resulting availability.

Specific examples of the component (B) include addition reaction products containing at least 3 SiH groups within each molecule, obtained by conducting a hydrosilylation reaction between one or two vinylnorbornenes described above and 1,3,5,7-tetramethylcyclotetrasiloxane, such as the compounds represented by a general formula (8) shown below:

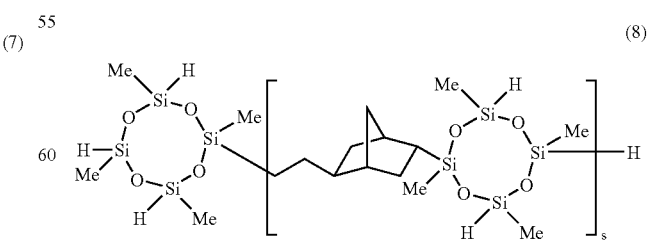

(8)

(wherein, s is an integer from 1 to 100, and preferably from 1 to 10).

Specific examples of preferred forms of the component (B) are presented below, although the component (B) is not restricted to the structures shown.

(HMeSiO)$_3$
(HMeSiO)$_4$
(HMeSiO)$_3$(Me$_2$SiO)
(HMeSiO)$_4$(Me$_2$SiO)

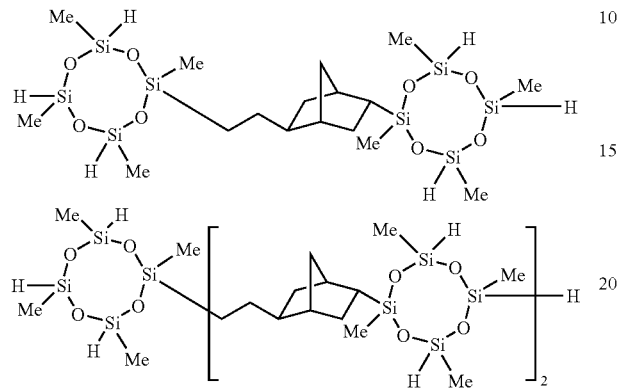

The component (B) of the present invention can use either a single compound, or a combination of two or more compounds.

The quantity of the component (B) is preferably selected as described below. The composition of the present invention may optionally contain components having silicon-bonded hydrogen atoms other than the component (B), and/or components having addition reactive carbon-carbon double bonds other than the component (A). The quantity of silicon-bonded hydrogen atoms per mol of addition reactive carbon-carbon double bonds in the compsition is normally in a range from 0.5 to 2.0. mols, preferably from 0.8 to 1.5 mols. And, the proportion of silicon-bonded hydrogen atoms contained in the component (B) normally accounts for 20 to 100 mole %, and preferably 40 to 100 mole % in the whole silicon-bonded hydrogen atoms in the whole composition of the present invention. Furthermore, the proportion of addition reactive carbon-carbon double bonds in the component (A) normally accounts for 20 to 100 mole %, and preferably 40 to 100 mole % in the whole addition reactive carbon-carbon double bonds in the whole composition of the present invention. In the case where the composition does not contain any optional components stated above, the quantity of the component (B) is normally adjusted so that relative to each 1 mol of addition reactive carbon-carbon double bonds within the component (A), the number of mols of SiH groups within the component (B) typically falls within a range from 0.5 to 2.0 mols, and preferably from 0.8 to 1.5 mols. By ensuring the quantity of the component (B) within the range described above, a cured product that displays sufficient hardness for applications such as coating materials can be obtained.

[Component (C)]

The hydrosilylation catalyst of the component (C) of the present invention can be the same as the catalyst described in the section above entitled "Preparation of the Component (A)".

There are no particular restrictions on the quantity of the component (C) added to a composition of the present invention, and any effective catalytic quantity is adequate, although a typical quantity, calculated as the weight of platinum group metal atoms relative to the combined weight of the component (A) and the component (B), is from 1 to 500 ppm, and preferably from 2 to 100 ppm. By ensuring a quantity within this range, the time required for the curing reaction is suitably short, and problems such as coloring of the cured product do not arise.

[Other Components]

In addition to the components (A) through (C) described above, other components may also be added to a composition of the present invention, provided such addition does not impair the objects and effects of the present invention.

<Antioxidants>

A cured product of a curable resin composition of the present invention may contain residual unreacted addition reactive carbon-carbon double bonds from the component (A), or may also contain carbon-carbon double bonds generated by ring-opening metathesis reactions such as 2-(bicyclo[2.2.1]hept-2-en-5-yl)ethyl groups represented by a structural formula (i) shown below:

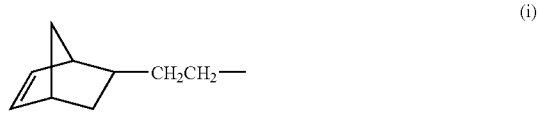

(i)

and/or 2-(bicyclo[2.2.1]hept-2-en-6-yl)ethyl groups represented by a structural formula (ii) shown below.

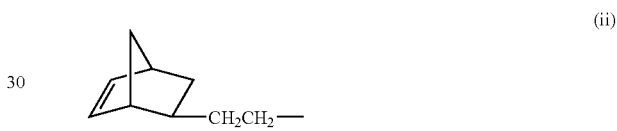

(ii)

If the cured product contains such carbon-carbon double bonds, then the double bonds will oxidize in atmospheric oxygen, causing coloring of the cured product.

Accordingly, if required, antioxidants can be added to a composition of the present invention to prevent this type of coloring from occurring.

Any of the conventionally available antioxidants can be used, and suitable examples include 2,6-di-t-butyl-4-methylphenol, 2,5-di-t-amylhydroquinone, 2,5-di-t-butylhydroquinone, 4,4'-butylidene-bis(3-methyl-6-t-butylphenol), 2,2'-methylene-bis(4-methyl-6-t-butylphenol), and 2,2'-methylene-bis(4-ethyl-6-t-butylphenol). These compounds can be used singularly, or in combinations of two or more different compounds.

In those cases where an antioxidant is used, there are no particular restrictions on the quantity added, and any quantity that provides effective antioxidant action is adequate, although a typical quantity, calculated relative to the combined weight of the component (A) and the component (B), is from 10 to 10,000 ppm, and preferably from 100 to 1,000 ppm. By ensuring a quantity within this range, the antioxidant action can be manifested satisfactorily, and a cured product with superior optical characteristics, with no coloring, turbidity or oxidation deterioration, can be obtained.

<Viscosity and Hardness Regulating Agents>

In order to regulate the viscosity of a composition of the present invention, or regulate the hardness of a cured product produced from a composition of the present invention, straight chain diorganopolysiloxanes or network-type organopolysiloxanes containing either alkenyl groups bonded to silicon atoms or SiH groups; and/or unreactive (that is, containing no alkenyl groups bonded to silicon atoms or SiH groups) straight chain or cyclic diorganopolysiloxanes or silphenylene based compounds may be added.

If an organopolysiloxane (D1) with any of a variety of structures containing alkenyl groups bonded to silicon atoms is added to a composition of the present invention, then the quantity of this organopolysiloxane must be set so that relative to 1 mol of the combined total of the alkenyl groups within this organopolysiloxane and the addition reactive carbon-carbon double bonds within the component (A), the quantity of SiH groups within the component (B) typically falls within a range from 0.5 to 2.0 mols, and preferably from 0.8 to 1.5 mols. Furthermore, if an organopolysiloxane (D2) with any of a variety of structures containing SiH groups is added to a composition of the present invention, then the quantity of this organopolysiloxane must be set so that relative to each 1 mol of addition reactive carbon-carbon double bonds within the component (A), the combined quantity of SiH groups within this organopolysiloxane and the SiH groups within the component (B) typically falls within a range from 0.5 to 2.0 mols, and preferably from 0.8 to 1.5 mols.

<Other Additives>

Furthermore, in order to extend the pot life, addition reaction control agents such as 1-ethynylcyclohexanol and 3,5-dimethyl-1-hexyn-3-ol may also be added. In addition, inorganic fillers such as fumed silica may also be added to improve the strength, provided such addition does not impair the transparency, and where necessary, dyes, pigments and flame retardants and the like may also be added.

In addition, light stabilizers can also be used for imparting resistance to light deterioration caused by light energy from sunlight or fluorescent lights or the like. Hindered amine based stabilizers, which capture the radicals generated upon oxidation and deterioration caused by light exposure, are ideal as these light stabilizers, and by using such light stabilizers in combination with the antioxidants described above, the oxidation prevention effect can be further improved. Specific examples of these light stabilizers include bis(2,2,6,6-tetramethyl-4-piperidyl) sebacate and 4-benzoyl-2,2,6,6-tetramethylpiperidine.

In addition, in those cases where a composition of the present invention is used as a sealing material, a silane coupling agent may be added to improve the adhesion to substrates, and a plasticizer may also be added to prevent cracking.

There are no particular restrictions on the curing conditions for a composition of the present invention, which will vary depending on the quantity of the composition, although normally, curing at 60 to 180° C. for a period of 5 to 180 minutes is preferred.

EXAMPLES

As follows is a description of details of the present invention, based on a series of examples and comparative examples, although the present invention is in no way restricted to the examples presented below.

Synthetic Example 1

Preparation of a Component (A)

In a 500 mL 4-neck flask equipped with a stirring device, a cooling tube, a dropping funnel and a thermometer was placed 156 g (1.3 mols) of a vinylnorbornene (brand name: V0062, manufactured by Tokyo Kasei Kogyo Co., Ltd., an approximately equimolar isomeric mixture of 5-vinylbicyclo[2.2.1]hept-2-ene and 6-vinylbicyclo[2.2.1]hept-2-ene), and the flask was then heated to 85° C. using an oil bath. 0.05 g of carbon powder supporting 5% by weight of platinum metal was then added, and with the mixture undergoing constant stirring, 67 g (0.5 mols) of 1,1,3,3-tetramethyldisiloxane was added dropwise over a period of 60 minutes. Following completion of the dropwise addition, the reaction mixture was heated and stirred at 90° C. for 24 hours, and was then cooled to room temperature. Subsequently, the carbon supported platinum metal was removed by filtration, and the excess vinylnorbornene was removed under reduced pressure, yielding 170 g of a colorless, transparent, oily reaction product (viscosity at 25° C.: 110 mm$^2$/s).

On the basis of the results of FT-IR, NMR and GPC analyses of this reaction product, it was confirmed as being a mixture of:

(1) a compound containing 1 —Si—O—Si— linkage: NBMe$_2$SiOSiMe$_2$NB approximately 70 mol %, (2) compounds containing 2 —Si—O—Si— linkages: approximately 25 mol % (one example of a representative structural formula is shown below),

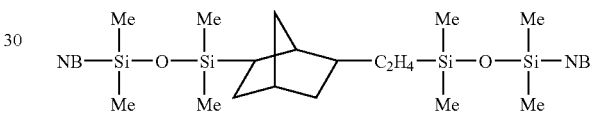

and (3) compounds containing 3 —Si—O—Si— linkages: approximately 5 mol % (one example of a representative structural formula is shown below),

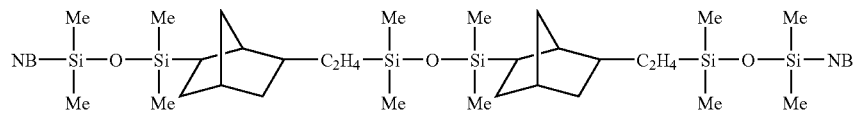

Furthermore, the quantity of addition reactive carbon-carbon double bonds within the mixture was 0.46 mols/100 g.

Synthetic Example 2

Preparation of a Component (A)

In a 500 mL 4-neck flask equipped with a stirring device, a cooling tube, a dropping funnel and a thermometer was placed 60 g (0.5 mols) of a vinylnorbornene (brand name: V0062, manufactured by Tokyo Kasei Kogyo Co., Ltd., an approximately equimolar isomeric mixture of 5-vinylbicyclo[2.2.1]hept-2-ene and 6-vinylbicyclo[2.2.1]hept-2-ene), and the flask was then heated to 85° C. using an oil bath. 0.02 g of carbon powder supporting 5% by weight of platinum metal was then added, and with the mixture undergoing constant stirring, 38.8 g (0.2 mols) of 1,4-bis(dimethylsilyl)benzene was added dropwise over a period of 25 minutes. Following completion of the dropwise addition, the reaction mixture was heated and stirred at 90° C. for 24 hours, and was then cooled to room temperature. Subsequently, the carbon supported platinum metal was removed by filtration, and the excess vinylnorbornene was removed under reduced pressure, yielding 79 g of a colorless, transparent, oily reaction product (viscosity at 25° C.: 1220 mm²/s).

On the basis of the results of FT-IR, NMR and GPC analyses of this reaction product, it was confirmed as being a mixture of:

(1) a compound containing 1 p-phenylene group: NBMe₂Si-p-C₆H₄—SiMe₂NB approximately 72 mol %, (2) compounds containing 2 p-phenylene groups: approximately 24 mol % (one example of a representative structural formula is shown below),

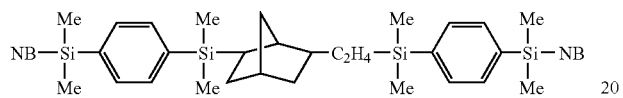

and (3) compounds containing 3 p-phenylene groups: approximately 4 mol % (one example of a representative structural formula is shown below),

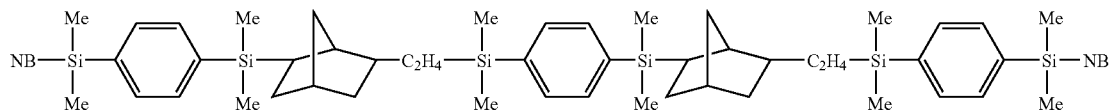

Furthermore, the quantity of addition reactive carbon-carbon double bonds within the mixture was 0.40 mols/100 g.

Synthetic Example 3

Preparation of a Component (B)

In a 500 mL 4-neck flask equipped with a stirring device, a cooling tube, a dropping funnel and a thermometer were placed 80 g of toluene and 115.2 g (0.48 mols) of 1,3,5,7-tetramethylcyclotetrasiloxane, and the flask was then heated to 117° C. using an oil bath. 0.05 g of carbon powder supporting 5% by weight of platinum metal was then added, and with the mixture undergoing constant stirring, 48 g (0.4 mols) of vinylnorbornene (brand name: V0062, manufactured by Tokyo Kasei Kogyo Co., Ltd., an approximately equimolar isomeric mixture of 5-vinylbicyclo[2.2.1]hept-2-ene and 6-vinylbicyclo[2.2.1]hept-2-ene) was added dropwise over a period of 16 minutes. Following completion of the dropwise addition, the reaction mixture was heated and stirred at 125° C. for 16 hours, and was then cooled to room temperature. Subsequently, the carbon supported platinum metal was removed by filtration, and the toluene was removed under reduced pressure, yielding 152 g of a colorless, transparent, oily reaction product (viscosity at 25° C.: 2,500 mm²/s).

On the basis of the results of FT-IR, NMR and GPC analyses of this reaction product, it was confirmed as being a mixture of:

(1) compounds containing 1 tetramethylcyclotetrasiloxane ring: approximately 6 mol % (one example of a representative structural formula is shown below),

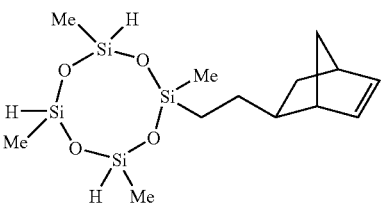

(2) compounds containing 2 tetramethylcyclotetrasiloxane rings: approximately 25 mol % (one example of a representative structural formula is shown below),

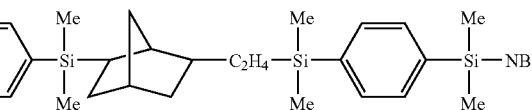

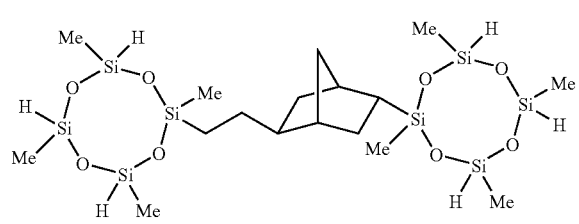

(3) compounds containing 3 tetramethylcyclotetrasiloxane rings: approximately 16 mol % (one example of a representative structural formula is shown below),

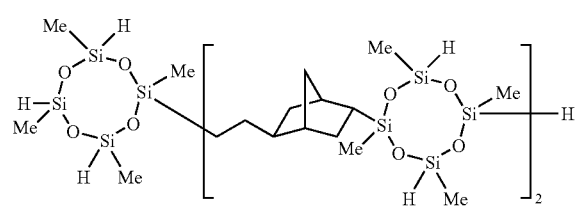

(4) compounds containing 4 tetramethylcyclotetrasiloxane rings: approximately 11 mol % (one example of a representative structural formula is shown below),

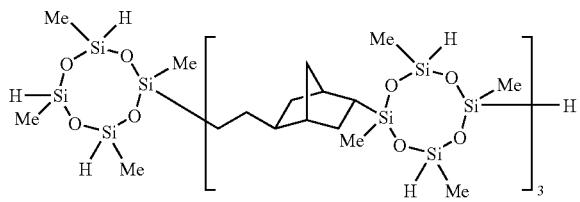

and (5) compounds containing from 5 to 12 tetramethylcyclotetrasiloxane rings: the remainder (one example of a representative structural formula is shown below),

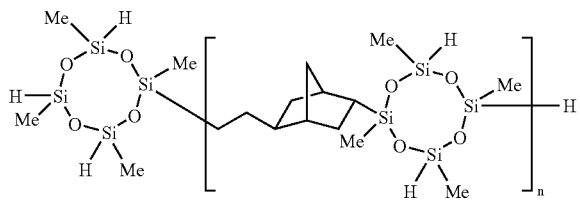

(wherein, n is an integer from 4 to 11).

The quantity of SiH groups within the mixture was 0.63 mols/100 g.

Example 1

(A1) The reaction product obtained in the synthetic example 1: 5 parts by weight, (A2) the reaction product obtained in the synthetic example 2: 60 parts by weight,
(B1) (MeHSiO)$_4$: 5 parts by weight, (B2) the reaction product obtained in the synthetic example 3: 30 parts by weight (the molar ratio [total SiH groups within the components (B1) and (B2)]/[total carbon-carbon double bonds within the components (A1) and (A2)]=1.03, hereafter, as was used above, this molar ratio of SiH groups/carbon-carbon double bonds is abbreviated as "SiH/C=C (molar ratio)"),
(C) platinum-vinylsiloxane complex: 20 ppm of platinum metal atoms relative to the combined weight of the components (A1), (A2), (B1) and (B2), and 1-ethynylcyclohexanol: 0.03 parts by weight were mixed together uniformly to form a composition. The composition was poured into a mold formed from glass plates to generate a thickness of 4 mm, and was then heated at 150° C. for 2 hours, thus yielding a cured product.

Example 2

(A2) The reaction product obtained in the synthetic example 2: 81 parts by weight,
(B1) (MeHSiO)$_4$: 19 parts by weight (SiH/C=C (molar ratio)=0.98),
(C) platinum-vinylsiloxane complex: 20 ppm of platinum metal atoms relative to the combined weight of the components (A2) and (B1), and 1-ethynylcyclohexanol: 0.03 parts by weight were mixed together uniformly to form a composition. The composition was poured into a mold formed from glass plates to generate a thickness of 4 mm, and was then heated at 150° C. for 2 hours, thus yielding a cured product.

Example 3

(A1) The reaction product obtained in the synthetic example 1: 58 parts by weight,
(B2) The reaction product obtained in the synthetic example 3: 42 parts by weight (SiH/C=C (molar ratio)=0.99),
(C) platinum-vinylsiloxane complex: 20 ppm of platinum metal atoms relative to the combined weight of the components (A1) and (B2), and 1-ethynylcyclohexanol: 0.03 parts by weight were mixed together uniformly to form a composition. The composition was poured into a mold formed from glass plates to generate a thickness of 4 mm, and was then heated at 150° C. for 2 hours, thus yielding a cured product.

Example 4

(A2) The reaction product obtained in the synthetic example 2: 61 parts by weight,
(B2) The reaction product obtained in the synthetic example 3: 39 parts by weight (SiH/C=C (molar ratio)=1.00),
(C) platinum-vinylsiloxane complex: 20 ppm of platinum metal atoms relative to the combined weight of the components (A2) and (B2), and 1-ethynylcyclohexanol: 0.03 parts by weight were mixed together uniformly to form a composition. The composition was poured into a mold formed from glass plates to generate a thickness of 4 mm, and was then heated at 150° C. for 2 hours, thus yielding a cured product.

Example 5

(A1) The reaction product obtained in the synthetic example 1: 10 parts by weight, (A2) the reaction product obtained in the synthetic example 2: 55 parts by weight,
(B1) (MeHSiO)$_4$: 5 parts by weight, (B2) the reaction product obtained in the synthetic example 3: 30 parts by weight (SiH/C=C (molar ratio)=1.02),
(C) platinum-vinylsiloxane complex: 20 ppm of platinum metal atoms relative to the combined weight of the components (A1), (A2), (B1) and (B2), and 1-ethynylcyclohexanol: 0.03 parts by weight were mixed together uniformly to form a composition. The composition was poured into a mold formed from glass plates to generate a thickness of 4 mm, and was then heated at 150° C. for 2 hours, thus yielding a cured product.

Comparative Example 1

With the exceptions of replacing the component (A1) and the component (A2) of the example 1 with 59 parts by weight of (A') (ViMeSiO)$_4$ (wherein, Vi represents a vinyl group), altering the quantity of the (MeHSiO)$_4$ of the component (B1) from 5 parts by weight to 41 parts by weight, and not using the component (B2) (namely, (SiH/Vi (molar ratio)=1.0), a composition and a cured product were produced in the same manner as the example 1.

Comparative Example 2

A phenylsilicone resin based curable composition (brand name: X-34-1195, manufactured by Shin-Etsu Chemical Co., Ltd., phenyl group content: approximately 50 mol %) was poured into a mold formed from glass plates in a similar manner to the example 1 to generate a thickness of 4 mm, and was then heated at 150° C. for 8 hours, thus yielding a cured product.

<Performance Evaluation Methods>

(1) The performance of the cured products prepared in each of the examples and comparative examples described above was evaluated using the following techniques.

External Appearance

The external appearance of each cured product was inspected visually. The results are shown in Table 1.

Hardness

The hardness (Shore D) of each cured product was measured in accordance with ASTM D 2240. The results of the measurements are shown in Table 1.

Elastic Modulus

A test specimen measuring 10 mm (width)×100 mm (length) was prepared from each 4 mm thick cured product, and the elastic modulus (MPa) of the test specimen was measured in accordance with JIS K-6911, using a 3 point bending test. The results of the measurements are shown in Table 1.

(2) Measurement of Shrinkage Factor

Each of the resin compositions obtained in the above examples and the comparative example 1 (and in the case of the comparative example 2, the aforementioned phenylsilicone resin based curable composition) was poured into a mold of dimensions 4 mm×10 mm×100 mm, cured by heating at 150° C. for 2 hours, and subsequently cooled, and the cured product was then removed from the mold.

The shrinkage factor on curing was calculated from the following equation. The results are shown in Table 1.

Shrinkage factor (%)=(length of molded product/length of mold)×100

(3) Light Transmittance

The light transmittance of each cured product was measured with a spectrophotometer, at four measurement wavelengths: 800, 600, 400 and 300 nm (ultraviolet light region). The results of the measurements are shown in Table 2.

What is claimed is:

1. A curable composition comprising:
(A) an addition reaction product of (a) a compound with 2 silicon atom-bonded hydrogen atoms within each molecule, represented by a general formula (1) shown below:

and (b) a polycyclic hydrocarbon with 2 addition reactive carbon-carbon double bonds within each molecule, said addition reaction product containing at least two addition reactive carbon-carbon double bond in each molecule,
(B) a compound comprising at least 3 silicon atom-bonded hydrogen atoms within each molecule, and
(C) a hydrosilylation reaction catalyst.

2. The composition according to claim 1, wherein said compound with 2 silicon atom-bonded hydrogen atoms of the component (a) is $HMe_2SiOSiMe_2H$, $HMe_2SiO(Me_2SiO)SiMe_2H$, $HMe_2SiO(Me_2SiO)_4SiMe_2H$, $HMe_2SiO(Me_2SiO)_8SiMe_2H$, $HMe_2SiO(Me_2SiO)_{12}SiMe_2H$, $HMe_2Si$-p-$C_6H_4$—$SiMe_2H$, $HMe_2Si$-m-$C_6H_4$—$SiMe_2H$, wherein in the formulas Me stands for a methyl group, or a combination of two or more thereof.

3. The composition according to claim 1, wherein said polycyclic hydrocarbon of said component (b) is 5-vinylbi-

TABLE 1

| | Examples | | | | | Comparative examples | |
|---|---|---|---|---|---|---|---|
| Item | 1 | 2 | 3 | 4 | 5 | 1 | 2 |
| External appearance | colorless, transparent | colorless, transparent | colorless, transparent | colorless, transparent | colorless, transparent | colorless, transparent | colorless, transparent |
| Hardness (Shore D) | 53 | 55 | 40 | 55 | 57 | 0 | 64 |
| Elastic modulus (MPa) | 1802 | 1901 | 1081 | 1859 | 1824 | 350 | 1520 |
| Shrinkage factor (%) | 0.2 | 0.1 | 0.2 | 0.2 | 0.3 | 2.2 | 1.2 |

TABLE 2

| | Examples | | | | | Comparative examples | |
|---|---|---|---|---|---|---|---|
| wavelength (nm) | 1 | 2 | 3 | 4 | 5 | 1 | 2 |
| 800 | 90% | 90% | 90% | 90% | 90% | 90% | 90% |
| 600 | 90% | 90% | 90% | 90% | 90% | 90% | 90% |
| 400 | 89% | 89% | 90% | 90% | 89% | 89% | 87% |
| 300 | 63% | 60% | 64% | 60% | 60% | 45% | 0% |

[Evaluations]

It is evident that in comparison with the comparative examples, the cured products from all of the examples display excellent hardness and elastic modulus values, and suffer extremely little curing shrinkage. Furthermore, it is also clear that these cured products provide excellent light transmittance at the short wavelength of 300 nm (ultraviolet light region).

cyclo[2.2.1]hept-2-ene, 6-vinylbicyclo[2.2.1]hept-2-ene, dicyclopentadiene, or a combination thereof.

4. The composition according to claim 1, wherein said component (A) comprises a compound represented by a general formula (6) shown below:

Y—X—(Y'—X)p-Y  (6)

wherein, X is a bivalent residue of a compound of the component (a), Y is a monovalent residue of a polycyclic hydrocarbon of said component (b), Y' is a bivalent residue of said component (b), and p is an integer from 0 to 10.

5. The composition according to claim 1, wherein said component (A) comprises:
NB-$Me_2SiOSiMe_2$-NB,
NB-$Me_2SiO(Me_2SiO)SiMe_2$-NB,
NB-$Me_2SiO(Me_2SiO)_4SiMe_2$-NB,
NB-$Me_2SiO(Me_2SiO)_8SiMe_2$-NB,
NB-$Me_2SiO(Me_2SiO)_{12}SiMe_2$-NB,
NB-$Me_2Si$-p-$C_6H_4$—$SiMe_2$-NB,
NB-$Me_2Si$-m-$C_6H_4$—$SiMe_2$-NB,

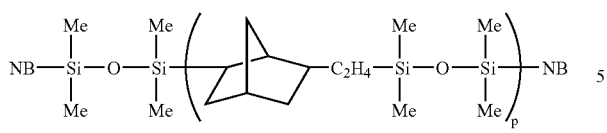

where p is an integer from 1 to 10,

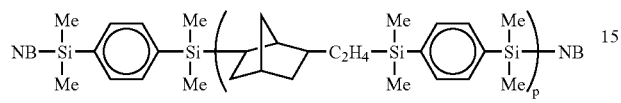

where p is an integer from 1 to 10,
DCP-Me$_2$SiOSiMe$_2$-DCP,
DCP-Me$_2$SiO(Me$_2$SiO)SiMe$_2$-DCP,
DCP-Me$_2$SiO(Me$_2$SiO)$_4$SiMe$_2$-DCP,
DCP-Me$_2$SiO(Me$_2$SiO)$_8$SiMe$_2$-DCP,
DCP-Me$_2$SiO(Me$_2$SiO)$_{12}$SiMe$_2$-DCP,
DCP-Me$_2$Si-p-C$_6$H$_4$—SiMe$_2$-DCP,
DCP-Me$_2$Si-m-C$_6$H$_4$—SiMe$_2$-DCP,

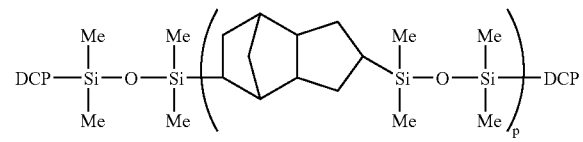

where p is an integer from 1 to 10,

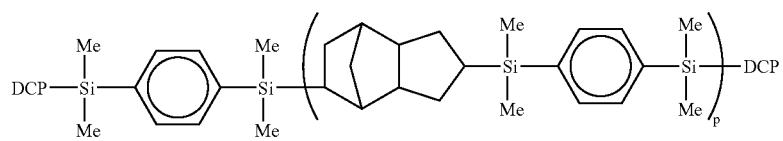

where p is an integer from 1 to 10, wherein the formulas above, Me stands for a methyl group, NB stands for a monovalent residue represented by any one of the structural formulas shown below:

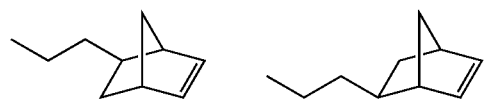

-continued

and DCP stands for a monovalent residue represented by any one of the structural formulas shown below:

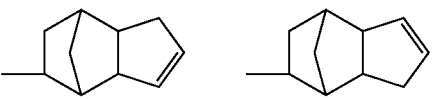

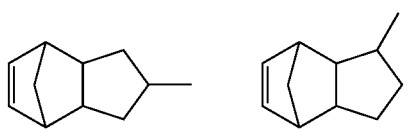

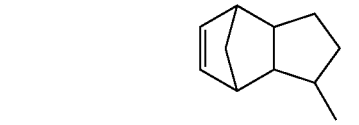

or a combination of two or more thereof.

6. The composition according to claim 1, wherein said component (B) comprises a cyclic siloxane represented by a general formula (7) shown below:

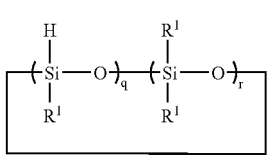

(7)

(wherein, each R$^1$ represents, independently, either a hydrogen atom, or an unsubstituted or substituted monovalent hydrocarbon group other than an alkenyl group, of 1 to 12 carbon atoms, q is an integer from 3 to 10, r is an integer from 0 to 7, and the sum of q+r is an integer from 3 to 10), a compound represented by a general formula (8) shown below:

(8)

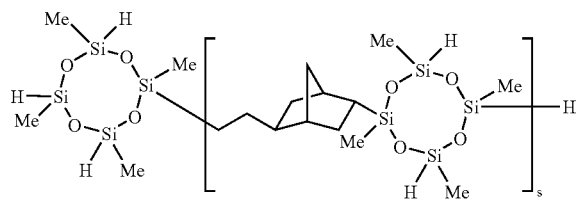

(wherein, s is an integer from 1 to 100), or a combination of thereof.

7. The composition according to claim 1, wherein said component (B) is 1,3,5,7-tetramethylcyclotetrasiloxane.

8. The composition according to claim 1, wherein said component (B) is an addition reaction product of 5-vinylbicyclo[2.2.1]hept-2-ene, 6-vinylbicyclo[2.2.1]hept-2-ene or a combination thereof, and 1,3,5,7-tetramethylcyclotetrasiloxane.

9. The composition according to claim 1, wherein said component (B) is present such that the quantity of silicon-bonded hydrogen atoms per mol of addition reactive carbon-carbon double bonds in the composition is in a range from 0.5 to 2.0. mols, and the proportion of silicon-bonded hydrogen atoms contained in the component (B) accounts for 20 to 100 mole % in the whole silicon-bonded hydrogen atoms in the whole composition, and that the proportion of addition reactive carbon-carbon double bonds in the component (A) accounts for 20 to 100 mole % in the whole addition reactive carbon-carbon double bonds in the whole composition, and that said component (C) is present in an effective quantity.

* * * * *